United States Patent

Davis et al.

[15] 3,642,563

[45] Feb. 15, 1972

[54] A LAMINATED FABRIC FOR USE AS THE FABRIC UPPER OF SHOES

[72] Inventors: Delbert A. Davis, Kernersville; Samuel R. Averette, Wilson, both of N.C.; Gary Dwight Voss, El Paso, Tex.

[73] Assignee: Burlington Industries, Inc., Greensboro, N.C.

[22] Filed: Sept. 23, 1969

[21] Appl. No.: 860,421

[52] U.S. Cl..................................161/88, 36/45, 117/11, 156/331, 161/159, 161/165, 161/182, 161/190, 260/429.5
[51] Int. Cl..................................................B32b 5/18
[58] Field of Search......................161/159–161, 165, 161/88, 190, 182; 260/429.5; 36/45, 46.5, 47; 156/326, 331; 117/11

[56] References Cited

UNITED STATES PATENTS

| | | |
|---|---|---|
| 3,251,727 | 5/1966 | Reynolds et al....................161/159 X |
| 2,792,320 | 5/1957 | Bower...................................161/96 X |
| 3,496,000 | 2/1970 | Hull et al. .........................161/159 X |
| 2,721,811 | 10/1955 | Dacey et al..............................117/65 |
| 3,422,165 | 1/1969 | Brotherton et al.................161/190 X |
| 2,838,418 | 6/1958 | Starkweather, Jr.............260/429.5 X |
| 3,362,036 | 1/1968 | Swan et al.........................161/190 X |
| 3,130,505 | 4/1964 | Markevitch........................161/159 X |

*Primary Examiner*—Philip Dier
*Attorney*—Cushman, Darby & Cushman

[57] ABSTRACT

A laminated fabric, suitable for use as the fabric upper of shoes, is prepared by bonding a layer of foam to the woven fabric, which will form the shell or outer covering of the shoe and, while the foam is still wet, bonding a second layer of fabric, which will form the inner lining or sock, to the foam and curing the thus-formed laminate. In a preferred embodiment a tiecoat which can be, for example, a solution of an aliphatic isocyanate, is applied to the woven shell fabric to also improve adhesion of the foam to that fabric and also to the thermoplastic sole and heel material used to make the shoe.

2 Claims, No Drawings

LAMINATED FABRIC FOR USE AS THE FABRIC UPPER OF SHOES

This invention relates to a laminated fabric suitable for use as the "uppers" in fabric shoes such as tennis shoes having, in particular, molded rubber or plastic toe, sole, and heel portions. More particularly, this invention relates to a laminated fabric comprising two layers of textile material with a layer of high-density foam material bonded between them.

It is commonly the practice in the manufacture of shoes having fabric uppers such as, for example, tennis or other athletic shoes, to first prepare the fabric upper and place it around a form which is inserted into a mold for making the toe, heel and sole portion of the shoe. Liquid plastic or rubber, for example polyvinyl chloride, natural rubber, acrylonitrile or styrene butadiene rubber, is then injected into the mold at high pressure and at a temperature of about 350°–400° F. for example. Unless the form upon which the fabric upper has been placed and the mold for the toe, heel and sole portion of the shoe, fit within close tolerances, the problem is encountered of spillage of the liquid material being cast out of the mold onto the fabric upper.

In order to prevent the spillage of the liquid plastic or rubber, close tolerances are usually maintained between the fabric material, which has been placed around the form, by employing fabrics having sufficient thickness to fit closely within the mold and thereby seal off the hollow portion of the mold in which the toe, heel and sole are cast from the fabric material forming the cloth upper of the shoe. The requisite thickness of material, which can be about 0.03–0.065 inches thick, is often realized by employing fabric made up of a number of layers of material. This procedure, however, has the disadvantage that it is relatively expensive to build up a fabric laminate in this manner using multiple layers of fabric material.

Accordingly, it is an object of this invention to provide a laminated fabric comprising only two layers of textile material with a third intermediate layer of high density foam, bonded between the two layers of textile material to provide a laminated fabric having the necessary thickness to be suitable for use as the fabric uppers of shoes having cast or molded rubber or plastic soles, such as, for example, tennis or other athletic shoes. It is a further object of this invention to provide a laminated fabric material suitable for use as the fabric uppers of shoes which "breathes", can be repeatedly washed in hot water, and has the necessary resiliency to maintain its shape. It is still a further object of the present invention to provide improved adhesion between the fabric forming the "upper" of the shoe and the molded toe, heel and sole portion of the shoe.

According to the present invention, a laminated material suitable, for example, for use as the uppers of "sneakers" or other athletic shoes in which a fabric upper is bonded to a molded rubber or plastic toe, sole and heel portion, is prepared by first forming a high-density foam, casting the foam on to an outer or shell fabric (suitable procedures for casting foams are, for example, described in U.S. Pat. No. 3,196,062 to Kristal), and then, while that cast foam is still wet, placing on the wet foam the inside or backing fabric. The backing fabric adheres to the wet foam which is then heated to dryness and then cured.

Fabrics which can be employed as the outer or shell material, can be any of the fabrics commonly employed in fabric shoes to form the uppers, for example cotton, or a polyester (Dacron) and cotton blend. A commonly employed fabric for the shell of this type of shoe which has been found to be particularly useful in the present invention is a 2½ to 4½ ounce 50 percent polyester (Dacron), 50 percent cotton blend.

Suitable backing fabrics for the side of the laminate forming the inside of the shoe can be, for example, cotton duck or drill, nylon tricot, or acetate.

The foam employed according to the present invention should have a high enough density to stiffen the fabric sufficiently so that it will conform to the shape of the shoe yet be resilient enough that the shoe will be comfortable and pliant. Suitable foam can be either open or closed cell foam, although the open cell foam is preferred since it will "breathe". Resilience of the foam is also important since the laminated fabric of this invention must return to form to avoid wrinkling. Suitable foam densities can be, for example, between about 0.47 and 0.94 g./cc., preferably about 0.65 and 0.84, and most preferably about 0.75 g./cc. Other criteria for foams employed in the present invention are that they be washable and resistant to temperatures at least as high as those encountered in washing or during laminating of the sole and heel section of the shoe to the fabric upper (about 375° F.); that the foam be moisture resistant; that it have good adhesion to the fabrics employed as both the outer shell and inner lining without breaking down during washing, that the material have sufficient strength, particularly where seams are formed, to withstand the strains induced during shoe manufacture by the equipment used in fabrication.

Foams suitable for use in the present invention, for example, those disclosed in U.S. Pat. No. 3,215,647, include styrene butadiene, vinyl acetate, vinyl chloride and natural rubber or combinations thereof, which are mixed with about 3–7 percent by weight of a metallic soap or mixture of soaps which cause foaming on agitation, about 0.1 to 0.5 weight percent of a release agent, such as, for example silicone, 1–5 weight percent melamine resin, all weight percents being based on the total weight of the foam. Suitable polyurethane foams can also be used. The preferred foam, however, is a styrene butadiene-natural rubber combination.

In one embodiment of the present invention, it has been found particularly desirable when employing blends of synthetic fibers as the shell material on to which the foam is deposited, such as for example a cotton-polyester blend, nylon-cotton blend, or nylon-rayon blend fabrics, to first coat the fabric with a tiecoat which will inhibit migration to the surface of the metallic soap used in the foam to cause foaming, as the migration of the soap to the surface adversely affects adhesion of the foam to the shell fabric surface. It is, of course, also desirable to employ such a coating in the case of pure cotton fabrics, though the problem of migration of the soap toward the interface of the foam and fabric, with subsequent impairment of bond strength, is not so great, as there is a greater degree of mechanical interlocking of the foam and cotton fabric than is the case with synthetic blends where adhesion is more dependent on the formation of a chemical bond between foam and the shell fabric. Where such mechanical adhesion is found, it is often sufficient to merely apply a vinyl chloride organisol.

In a further embodiment of the present invention, the adhesion to the sole and heel material of the fabric material forming the "uppers" of the shoe is improved by the application also of a tiecoat to the shell fabric. As in the case of foam substrates, where mechanical adhesion between the shell fabric (for example cotton) and the sole material (which may be for example vinyl chloride or styrene butadiene) a vinyl chloride organisol applied to the fabric may provide sufficient adhesion.

One suitable composition with which the material which is to form the outer shell of the shoe can be coated to improve adhesion of many foams or sole materials (e.g., vinyl chloride, styrene butadiene, natural rubber, or acrylonitrile sole material) to the shell comprises 1–3 weight percent, preferably about 2 weight percent of an organic titanate, to which can be added 1–3 weight percent, preferably about 2–3 weight percent of melamine formaldehyde resin, and the balance, a suitable organic solvent such as toluene, for example, or water. Suitable organic titanates for use to improve adhesion between substrate and sole material or foam have the formulas:

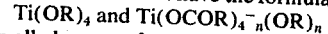
$$Ti(OR)_4 \text{ and } Ti(OCOR)_{4-n}(OR)_n$$

where R is an alkyl group of two–20 carbon atoms or a mixed or polymerized alkyl, aryl, or cycloalkyl group, and n is 0–3. Preferred titanates are tetraisopropyl titanate and titanium acetyl acetonate.

Application of the organic titanate-melamine formaldehyde resin of this invention to the fabric can be by a variety of procedures such as, for example "pad-dipping" or by the "dip and nip" method, whereby the fabric is passed on rollers through the tiecoat bath and then under tension passes a rod or roller which removes the excess. While a single pass of the fabric through the resin solution has been found satisfactory, several passes can be made. Curing of the tiecoat impregnated fabric substrate can be effected, for example, by passing the material through an oven or series of ovens maintained at a moderate temperature range of about 200° F. to 280° F.

Table I illustrates the superior adhesion obtained using a coating of organic titanate-melamine resin tiecoat: The formulations were applied to a 65 percent polyester—35 percent cotton blend fabric substrate and dried in an air circulating oven at about 260° F. and a styrene butadiene rubber foam applied and cured.

TABLE I

| Composition (weight %) | A | B | C | D |
|---|---|---|---|---|
| Melamine-Formaldehyde Resin | 0 | 2.0 | 2.0 | 2.0 |
| Tetraisopropyl titanate | 0 | 0 | 2.0 | 3.0 |
| Toluene | 0 | 98.0 | 96.0 | 95.0 |
| Adhesion of foam to substrate (lbs./sq. in.) | 5.6 | 12.6 | 19.0 | 13.3 |

Similar results were obtained with similar application of the tetraisopropyl titanate-melamine formaldehyde resin tiecoat shown above and styrene-butadiene foam to other fabrics:

TABLE II

| | Foam Adhesion (lb./sq. in.) | |
|---|---|---|
| Fabric | w/o tiecoat | with tiecoat |
| Polyester | 3.0 | 18.0 |
| Nylon | 7.5 | 16.0 |
| Polyester-Rayon | 4.0 | 16.0 |
| Nylon-Cotton | 8.0 | 15.0 |
| Cotton | 9.0 | 17.0 | acetate containing a maximum of 20 percent vinyl acetate and preferably a maximum of 10 percent.

Typical plasticizers (e.g., organic phosphates, phthalates or acrylonitriles) are employed in the tiecoat and can be, for example, dioctyl phthalate, diiso-octyl-decyl phthalate and di-n-octyl phthalate. Flame resistance can be improved by using a phosphate plasticizer, for example, tri-cresyl phosphate.

Organic isocyanates which are employed in the tiecoat can be either aromatic or aliphatic, though tiecoat compositions containing aliphatic isocyanates are preferred over both the aromatic isocyanates and tiecoats previously described, which contain organic titanates and melamine-formaldehyde resin, as the aliphatic isocyanate based composition has been found not to produce the "yellowing" associated with other tiecoats. Typical aromatic isocyanates are methylene bis(4-phenylisocyanate) and polymethylene polyphenylisocyanate. Aliphatic isocyanates of this invention have the general formula:

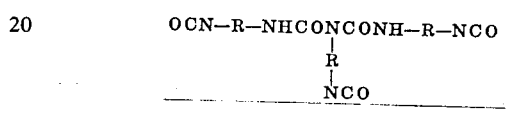

where R is an alkyl group of three–eight, preferably six, carbon atoms.

Once the tiecoat has been applied to the fabric, for example, by dip coating and removing the excess either by the "nip" method of drawing the fabric under tension over a straight edge or with pads, the coated fabric is dried in an oven for a sufficient period of time and at a sufficiently high temperature to remove the solvent. Typical drying temperatures should not exceed about 450° F. to avoid weakening the fabric. If desired, the drying can advantageously be carried out in stages whereby the temperature is increased in increments.

Foam is conveniently produced, for example, by mechanical agitation, and then deposited onto the woven fabric which has been treated with the tiecoat. While the foam is still wet, the woven material which will form the inner liner of the shoe or sock is placed on the wet foam and the laminate then cured, for example in an oven at a temperature of about 275° to 450° F. If desired, the curing may conveniently be effected by passing the laminate through a series of ovens at a controlled

TABLE III

| Sample Number | Fabric | Percent melamine-formaldehyde resin | Percent titanate | Type tyzor | Type solvent | Adhesion, lbs./sq. in |
|---|---|---|---|---|---|---|
| A | Poplin, polyester cotton | 2 | 1 | Tetraisopropyl titanate | Toluene | 9.3 |
| B | do | 2 | 2 | Tetrabutyl titanate | do | 17.0 |
| C | do | 2 | 2 | Tetrakis 2-ethylhexyl titanate | do | 17.0 |
| D | do | 2 | 2 | Polymerized C₄ titanate | do | 15.6 |
| E | do | 2 | 2 | Acetylacetonate | do | 18.0 |
| F | do | 2 | 0 | | do | 12.6 |
| G | do | | | | do | 11.0 |
| H | do | 1 | 2 | Tetraisopropyl titanate | do | 19.0 |

In a further embodiment of the present invention, it has been found that the migration to the surface of soap present in the foam used in this invention, with consequent decrease in adhesion between the foam or sole material and the fabric substrate can also effectively be inhibited by the application to the substrate of a tiecoat containing about 2 to 3.5 weight percent, preferably about 2.9 weight percent vinyl acetate copolymer, about 1 to 2.2 weight percent, preferably about 1.8 weight percent, of a suitable plasticizer and 0.2 to 0.4 weight percent, preferably about 0.3 weight percent of an organic isocyanate, the total solids content being between about 4 and 6 percent by weight in an organic solvent such as, for example, toluene, Varsol, dimethyl formamide, methyl ethyl ketone or mixtures thereof.

The preferred vinyl acetate copolymers employed in this invention to form the tiecoat are high molecular weight vinyl acetate-acrylonitrile copolymers containing about 39 percent acrylonitrile and a copolymer of vinyl chloride and vinyl rate, the ovens being maintained at progressively higher temperatures within the indicated range.

EXAMPLE

A tiecoat containing 5.5 percent by weight total solids and comprising 40 parts by weight toluene, 10 parts by weight vinyl acetate-acrylonitrile copolymer, 25 parts by weight methyl ethyl ketone, 8 parts by weight diiso-octyl-decyl phthalate and 1 part by weight of an aliphatic isocyanate having the formula

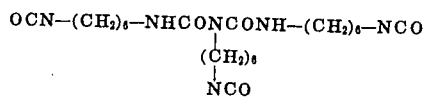

was dip coated by total emersion onto a 50–50 polyester-cotton blend woven fabric and the excess removed with pads. The tiecoat was then dried by passing the coated fabric through a series of ovens for a distance of 150 ft. at a speed of 40 yards/minute. The ovens were maintained at consecutive temperatures of 275° F., 325° F. and 375° F. Subsequent to drying of the tiecoat, a carboxylated styrene-butadiene rubber foam having a density of 0.75 g./cc. and containing 0.3 weight percent silicone release agent and about 5 percent by weight of a metallic soap, was formed by mechanical agitation and applied to the dried polyester and cotton fabric impregnated with the tricot. While the foam was still wet a nylon tricot fabric was placed over it, and the laminated fabric comprising the two outer layers of nylon tricot and polyester-cotton, respectively, with the foam intermediate layer passes to an oven for drying and curing. Drying of the foam was carried out at about 250° F. for 2 minutes and curing at about 360° F. for 4 minutes. The resulting laminated fabric showed a bond strength between sole material and polyester-cotton of 13–19 lbs./sq. inch.

We claim:

1. A laminated fabric comprising a first layer of a woven fabric of polyester and cotton, an intermediate layer of cured styrene-butadiene foam containing 3–7 weight percent of a metallic soap, 0.1 to 0.5 weight percent of a release agent and 1 to 5 weight percent melamine resin, said foam being bonded to the polyester-cotton fabric by means of a tiecoat which has been applied to said fabric and which comprises a solution comprising 0.2 to 0.4 weight percent of an aliphatic isocyanate having the formula $$OCN-(CH_2)_6-NHCONCONH-(CH_2)_6-NCO$$
$$\underset{NCO}{\overset{(CH_2)_6}{|}}$$

2 to 3.5 weight of a vinyl acetate-vinyl chloride copolymer, and about 1 to 2.2 weight percent dioctyl phthalate in methyl ethyl ketone, and a layer of woven nylon tricot also bonded to said intermediate layer of foam, the total thickness of the laminated fabric being about 0.03 to 0.065 inches.

2. A laminated fabric suitable for use as the fabric uppers of shoes comprising a first layer of woven fabric, a second, intermediate layer comprising a cured high density, open cell foam bonded to said first layer, and a third woven fabric layer which is also bonded to said intermediate layer of foam, the total thickness of said laminated fabric being from about 0.03 to 0.065 inches, said foam having a density of about 0.47 to 0.94 g./cc. and comprising an elastomer selected from the group consisting of styrene-butadiene, vinyl acetate, vinyl chloride, and natural rubber or mixtures thereof in combination with about 3–7 weight percent of a release agent and 1–5 weight percent melamine resin.

* * * * *